United States Patent [19]
Akesson et al.

[11] Patent Number: 4,953,644
[45] Date of Patent: Sep. 4, 1990

[54] STABILIZING AND WEIGHING DEVICE

[75] Inventors: Rune Akesson, Hyllinge; Giuliano Pegoraro, Bjuv, both of Sweden

[73] Assignee: Nestec S.A., Vevey, Switzerland

[21] Appl. No.: 442,944

[22] Filed: Nov. 29, 1989

[30] Foreign Application Priority Data

Dec. 17, 1988 [EP] European Pat. Off. ........ 88121200.5

[51] Int. Cl.⁵ .................... G01G 19/00; B65G 15/14
[52] U.S. Cl. ................................... 177/145; 198/626
[58] Field of Search ................ 177/145, 504, 505; 198/606, 626, 817

[56] References Cited
U.S. PATENT DOCUMENTS

| | | | |
|---|---|---|---|
| 3,212,621 | 10/1965 | Daugherty | 198/817 X |
| 4,050,467 | 9/1977 | Van Sluis et al. | 198/626 X |
| 4,185,709 | 1/1980 | Irvine | 177/145 |
| 4,270,650 | 6/1981 | Krohn | 198/626 X |
| 4,273,649 | 6/1981 | Leverett | 198/626 X |
| 4,868,951 | 9/1989 | Akesson et al. | |

Primary Examiner—George H. Miller, Jr.
Attorney, Agent, or Firm—Vogt & O'Donnell

[57] ABSTRACT

Articles of irregular shapes and sizes are stabilized and weighed by being transported by two upstream to downstream successive pairs of adjacent parallel conveyors which are suitable for transporting the articles and which are inclined to one another at their adjacent longitudinal edges so that their upper surfaces form an acute angle, the upstream pair of conveyors forming a stabilizing unit and the downstream pair of conveyors providing a load-bearing platform of a weighing machine to form a weighing unit.

8 Claims, 2 Drawing Sheets

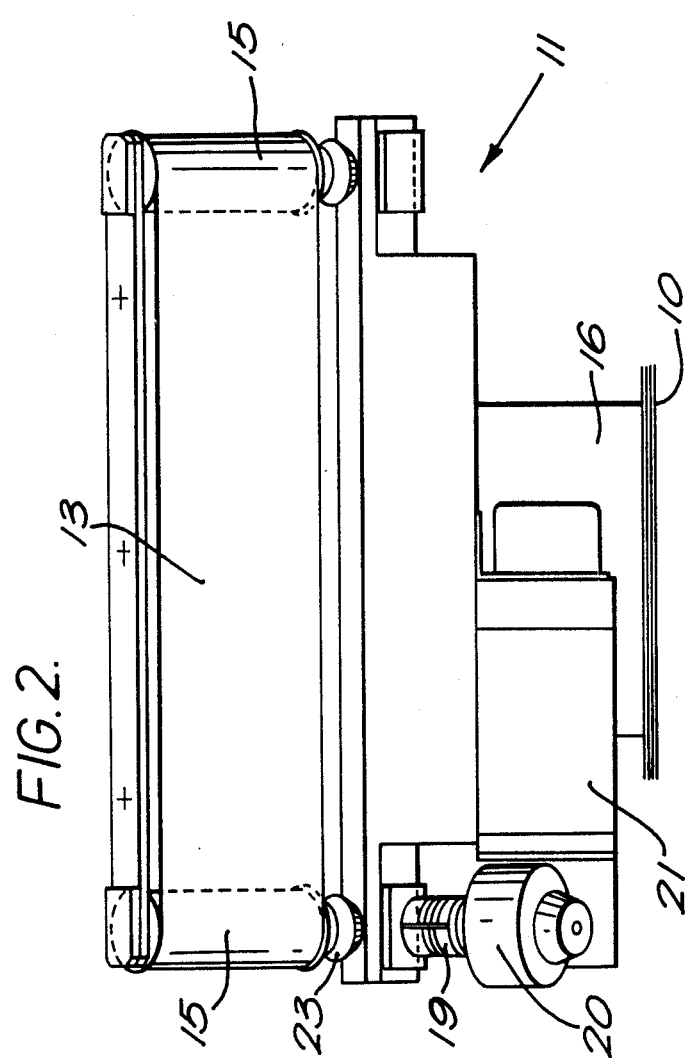
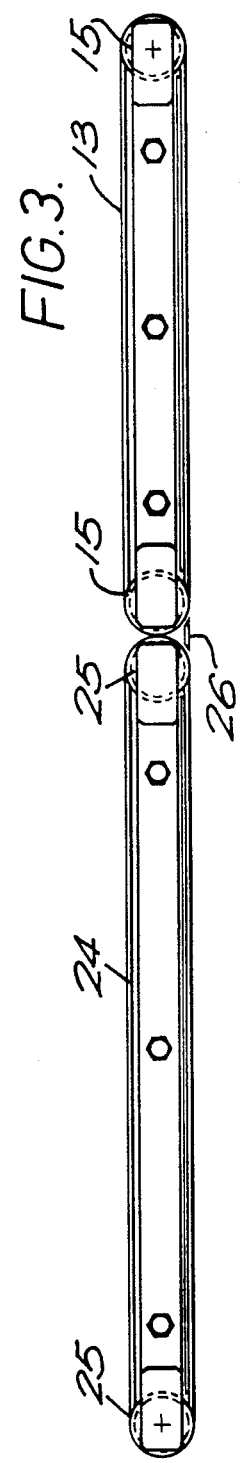

STABILIZING AND WEIGHING DEVICE

BACKGROUND OF THE INVENTION

The present invention relates to a stabilizing and weighing device for articles of different shapes and sizes.

After tails have been cut off from cod fillets, the loin and belly flap remain. The belly flap is removed, and it would be desirable to cut the loins into chunks and grade them automatically at high speed. However, the chunks are of varying shapes and sizes and they tend to wobble about so that it is impossible to achieve an accurate weight at the high speed required. We have now devised a method of stabilizing and weighing the chunks so that a more accurate weight can be obtained which enables the chunks to be graded at high speed.

SUMMARY OF THE INVENTION

Accordingly, the present invention provides a device for stabilising and weighing articles of irregular shapes and sizes which comprises two successive pairs of adjacent parallel conveyors suitable for transporting the articles and a weighing machine characterised in that the two conveyors of each pair of conveyors are inclined to one another at their adjacent longitudinal edges so that the upper surfaces form an acute angle, the upstream pair of conveyors forming a stabilising unit and the downstream pair of conveyors acting as the load-bearing platform of the weighing machine to form a weighing unit.

The present invention also provides a process for stabilising and weighing articles of irregular shapes and sizes which comprises feeding the articles of irregular shapes and sizes one by one onto the upstream end of two successive pairs of adjacent parallel conveyors characterized in that the two conveyors of each pair of conveyors are inclined to one another at their adjacent longitudinal edges so that the upper surfaces form an acute angle, wherein the articles are stabilised as they are transported along the upstream pair of adjacent parallel conveyors and then weighed one at a time on the downstream pair of conveyors which acts as the load-bearing platform of a weighing machine as they are transported along it.

DETAILED DESCRIPTION OF THE INVENTION

The conveyors are conveniently endless conveyor belts, and the acute angle formed by the adjacent longitudinal edges of the upper surfaces of the two conveyors of each pair should be sufficient to enable the pair of conveyors to stabilize the articles and prevent them from wobbling as they travel along the upper surfaces of the conveyors. The acute angle is conveniently from 10° to 80°, preferably from 20° to 70° more preferably from 30° to 60° and especially from 40° to 50°. The length of the upstream pair of conveyors may vary but it should be sufficient to ensure that the articles are stabilised before they reach the downstream pair of conveyors where they are weighed. For chunks of fish weighing from about 10-50 g and similar sized products the length of the pair of upstream conveyors is preferably above 30 cm and usually from 30 to 60 cm. The length of the downstream pair of conveyors which form part of the weighing unit is preferably less than the length of the upstream pair of conveyors and may be, for instance, from 50 to 80% of the upstream pair of conveyors.

The weighing machines are conveniently of the type consisting of continuously working scales based on load cells, or they may be spring balances.

The distance between the downstream end of the stabilising unit and the upstream end of the weighing unit should be as small as possible in order not to disturb the stabilised product, e.g., for chunks of fish weighing from 10-50 g, this distance may be from 2-4 mm.

It is important that there is only one article at any one time on the downstream pair of conveyors in order to obtain an accurate weight reading. Since the articles are stable as they travel along the upper surfaces of the downstream pair of conveyors, the weight recorded is very reliable and, afterwards if desired, the articles may be graded according to their weights, either individually or in combination, by conventional means such as a computer actuated by a control device which receives a signal from the weighing machine and sorts the articles accordingly. The belts of the stabilising unit are generally driven at substantially the same speed as those of the weighing unit. The maximum speed of the belts is determined by the accuracy of the weighing unit which becomes problematical at speeds of about 150 meters/min. There is no lower limit but preferably the speed of the belts is from 50 to 125 and especially from 70 to 110 meters/min.

The present invention is applicable to a variety of articles of irregular shapes and sizes and is particularly useful for articles of food such as pieces of meat, fish or vegetables, especially where it is desired to grade them according to their weights at a high speed. In this invention up to 200-300 pieces per minute can be graded. This invention is particularly valuable for grading chunks of fish weighing from about 10-50 g the smaller portions being for use in soups, casseroles, etc, which may be prepared for consumption in a microwave oven while the larger portions are more naturally shaped fish products which may be used for fish in sauces etc.

As the articles are fed to the upstream end of the upstream pair of parallel conveyors, it is important that the distance between each article is greater than the length of the pair of downstream conveyors in order to ensure that there is only one article at any one time on the weighing unit. Clearly, a greater capacity can be achieved when the length of the pair of downstream conveyors is shorter.

The invention will now be further illustrated, by way of example only, with reference to the accompanying drawings.

BRIEF DESCRIPTION OF THE DRAWINGS

FIG. 2 is a diagrammatic side view of the weighing unit.

FIG. 3 is a diagrammatic side view of one of each of the successive pairs of parallel conveyors one forming part of the weighing unit and the other forming part of the stabilising unit looking in the direction of the arrows in FIG. 1.

Figure 1:
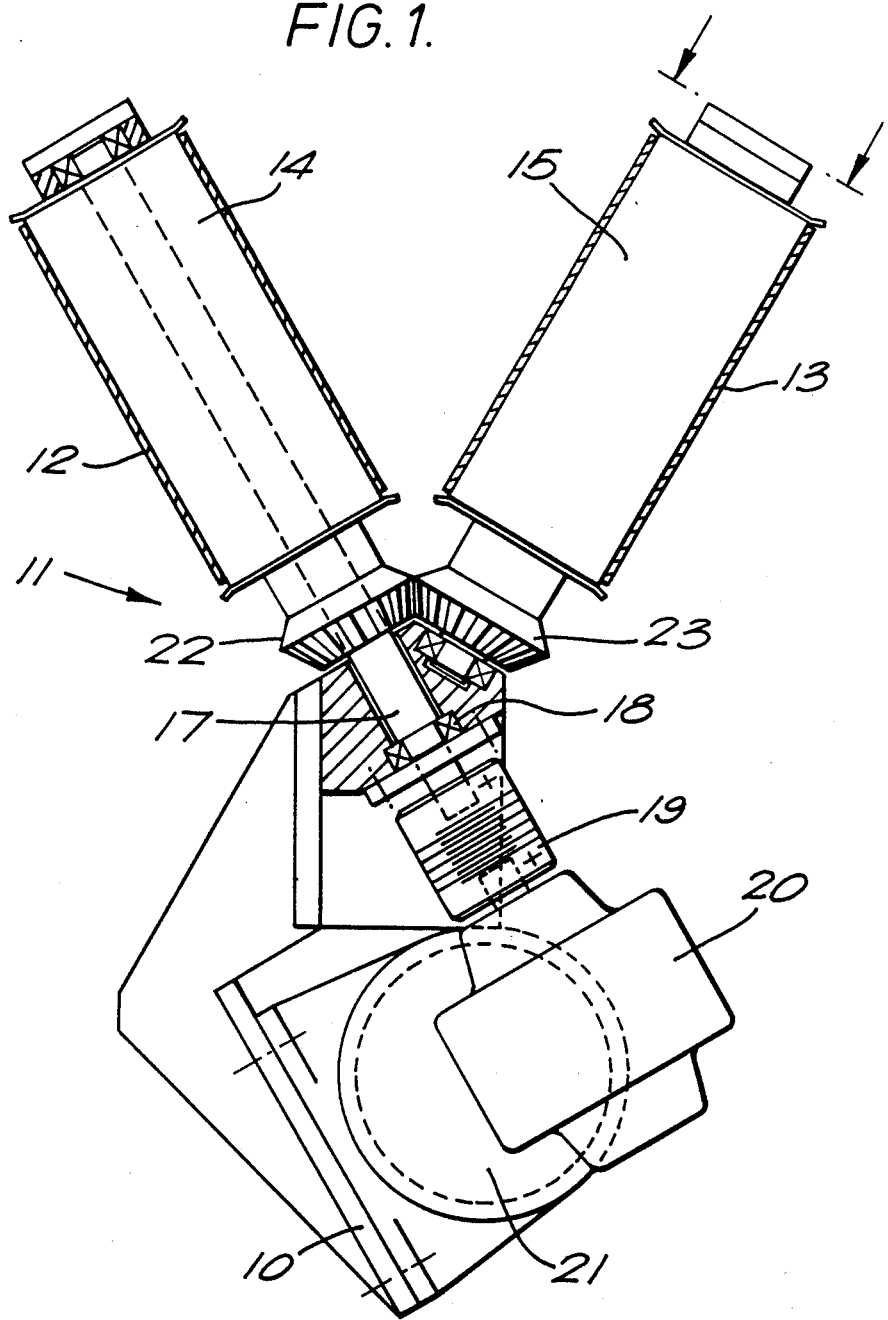
FIG. 1 is a diagrammatic sectional view of the weighing unit looking in a longitudinal direction.

Referring to the drawings, the machine supported by a frame 10 comprises a weighing unit 11 depicted in FIGS. 1 and 2 having two endless toothed conveyor belts 12,13 each 30 cm in length trained about pairs of toothed wheels 14,15 respectively. The conveyor belts 12,13 act as the load bearing platform of a load cell 16.

The toothed wheel 14 is provided with an axle 17, a bearing 18, a flexible hub 19 and a worm gear 20 through which it is driven by a motor 21. The toothed wheel 15 is driven by means of bevel gear wheels 22,23. The stabilising unit is essentially similar to the weighing unit except that it is 45 cm long and there is no load cell. FIG. 3 shows one of the endless conveyor belts 24 of the stabilising unit trained about a pair of toothed wheels 25 as well as an adjustment plate 26 to ensure that the gap between the belts of the weighing unit and that of the stabilising unit is appropriate.

In operation, cod chunks weighing from 10–50 g are fed one at a time on to the infeed end of the conveyor belts 24 of the stabilising unit so that the distance between each successive chunk is 35 cm. The stabilised chunks pass from the conveyor belts 24 to the conveyor belts 12,13 of the weighing unit across a gap of 3 mm. The belts travel at a speed of 90 meters/min. As there is only one chunk at any one time on the belts 12,13 of the weighing unit an accurate weight measurement of each chunk can be recorded after which the chunks are graded according to their weights by a computer actuated by a control device (not shown).

We claim:

1. A device for stabilising and weighing articles of irregular shapes and sizes which comprises a weighing machine and two upstream to downstream successive pairs of adjacent parallel conveyors, wherein each pair of conveyors have parallel upper surfaces having adjacent parallel longitudinal edges for transporting the articles and wherein the upper surfaces of the two conveyors of each pair of conveyors are inclined to one another at their adjacent longitudinal edges so that the upper surfaces form an acute angle, the upstream pair of conveyors providing a unit for stabilising the articles transported and the downstream pair of conveyors providing a load-bearing platform for the weighing machine to form a weighing unit for weighing the articles transported.

2. A device according to claim 1 wherein the acute angle formed by the adjacent longitudinal edges of the upper surfaces of the two conveyors of each pair is from 30° to 60°.

3. A device according to claim 1 wherein the pair of upstream conveyors have a length of from 30 cm to 60 cm.

4. A device according to claim 1 wherein the pair of downstream conveyors have a length of from 50% to 80% less than a length of the pair of upstream conveyors.

5. A device according to claim 1 wherein there is a distance between the downstream and upstream conveyors of from 2 mm to 4 mm.

6. A process for stabilising and weighing articles of irregular shapes and sizes which comprises feeding articles of irregular shapes and sizes one by one to upper surfaces of an upstream end of two upstream to downstream successive pairs of adjacent parallel conveyors, wherein each pair of conveyors have parallel upper surfaces having adjacent parallel longitudinal edges, wherein the upper surfaces of the two conveyors of each pair of conveyors are inclined to one another at their adjacent longitudinal edges so that the upper surfaces form an acute angle and wherein the downstream pair of conveyors provides a load-bearing platform for a weighing machine, transporting the articles on the upstream pair of conveyors for stabilising the articles as the articles are transported, feeding the stabilised articles from the upstream pair of conveyors to the upper surfaces of the downstream pair of conveyors and then transporting the articles one at a time on the downstream pair of conveyors for weighing the articles one at a time as the articles are transported on the downstream pair of conveyors.

7. A process according to claim 6 wherein the articles are fed to the upstream end of the upstream pair of parallel conveyors so that a distance between each article is greater than a length of the pair of downstream conveyors.

8. A process according to claim 6 wherein the articles are transported at a speed of from 50 meters/min to 125 meters/min.

* * * * *